United States Patent
Liu et al.

(10) Patent No.: US 6,988,439 B2
(45) Date of Patent: Jan. 24, 2006

(54) CUTTING APPARATUS WITH A LIGHT-EMITTING UNIT FOR ALIGNMENT OF A WORKPIECE

(75) Inventors: Ta-Chung Liu, Taichung (TW); Yueh-Hsun Chang, Nan-Tou Hsien (TW)

(73) Assignee: P & F Brother Industrial Corporation, Taichung (TW)

( * ) Notice: Subject to any disclaimer, the term of this patent is extended or adjusted under 35 U.S.C. 154(b) by 184 days.

(21) Appl. No.: 10/609,225

(22) Filed: Jun. 27, 2003

(65) Prior Publication Data

US 2004/0221704 A1   Nov. 11, 2004

(30) Foreign Application Priority Data

May 8, 2003   (TW) ............... 92208420 U (51) Int. Cl.
*B26D 7/00*   (2006.01)
*B27B 5/29*   (2006.01)

(52) U.S. Cl. .............. 83/520; 83/471.3; 83/490; 83/522.15; 362/89

(58) Field of Classification Search .............. 83/520, 83/521, 471.3, 486, 486.1, 478, 490, 522.13, 83/522.15, 522.16; 30/388–391; 362/89, 362/259, 285, 287
See application file for complete search history.

(56) References Cited

U.S. PATENT DOCUMENTS

| | | | | |
|---|---|---|---|---|
| 2,806,492 A * | 9/1957 | Becker | | 83/520 |
| 3,504,716 A * | 4/1970 | Bush et al. | | 30/123 |
| 4,257,297 A * | 3/1981 | Nidbella | | 83/520 X |
| 4,468,993 A * | 9/1984 | McCown et al. | | 83/522.15 X |
| 5,285,708 A * | 2/1994 | Bosten et al. | | 83/520 |
| 5,375,495 A * | 12/1994 | Bosten et al. | | 83/520 |
| 5,461,790 A * | 10/1995 | Olstowski | | 30/391 |
| 6,481,322 B1 * | 11/2002 | Hsiung | | 83/520 X |
| 6,578,459 B2 * | 6/2003 | Waite | | 83/520 X |
| 6,688,203 B2 * | 2/2004 | Chen | | 83/520 |
| 6,742,430 B2 * | 6/2004 | Chen | | 83/520 |
| 2001/0049988 A1 * | 12/2001 | Ushiwata et al. | | 83/520 |
| 2003/0047050 A1 * | 3/2003 | Onose et al. | | 83/469 |
| 2003/0097922 A1 * | 5/2003 | Chen | | 83/520 |
| 2003/0172789 A1 * | 9/2003 | Chen | | 83/522.15 |
| 2003/0233921 A1 * | 12/2003 | Garcia et al. | | 83/520 |

* cited by examiner

*Primary Examiner*—Clark F. Dexter
(74) *Attorney, Agent, or Firm*—Trop, Pruner & Hu, P.C.

(57) ABSTRACT

A cutting apparatus includes a base, a blade-holding arm mounted rotatably on the base, a blade mounted rotatably on the blade-holding arm and rotatable about an axis, and a light-emitting unit mounted on the blade-holding arm and adapted to project an image line on the workpiece. The light-emitting unit is movable in a transverse direction relative to the blade between a first position, in which the image line is disposed at a first lateral side with respect to the blade, and a second position, in which the image line is disposed at a second lateral side with respect to the blade.

3 Claims, 10 Drawing Sheets

CUTTING APPARATUS WITH A LIGHT-EMITTING UNIT FOR ALIGNMENT OF A WORKPIECE

CROSS-REFERENCE TO RELATED APPLICATION

This application claims priority of Taiwanese application No. 092208420, filed on May 8, 2003.

BACKGROUND OF THE INVENTION

1. Field of the Invention

This invention relates to a cutting apparatus with a light-emitting unit for alignment of a workpiece during a cutting operation.

2. Description of the Related Art

Figure 1:
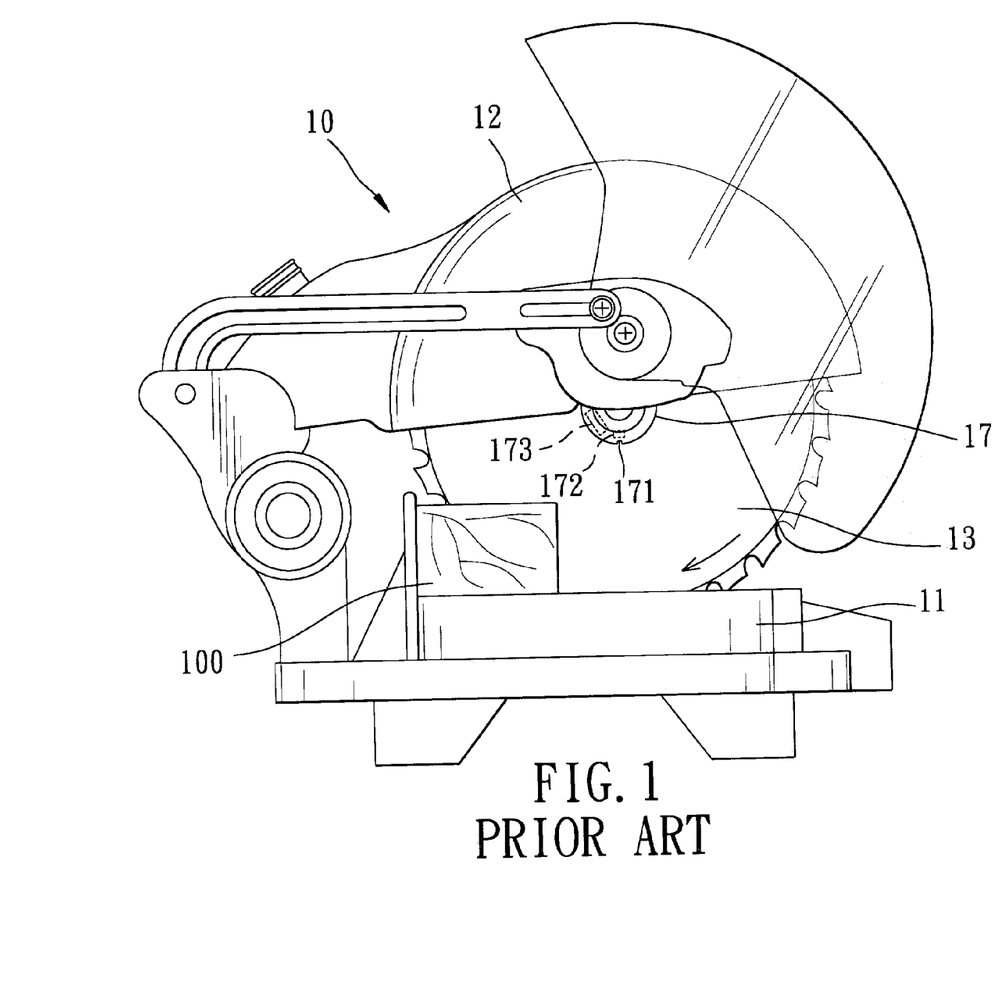
FIG. 1 is a side view of a conventional cutting apparatus.
Figure 2:
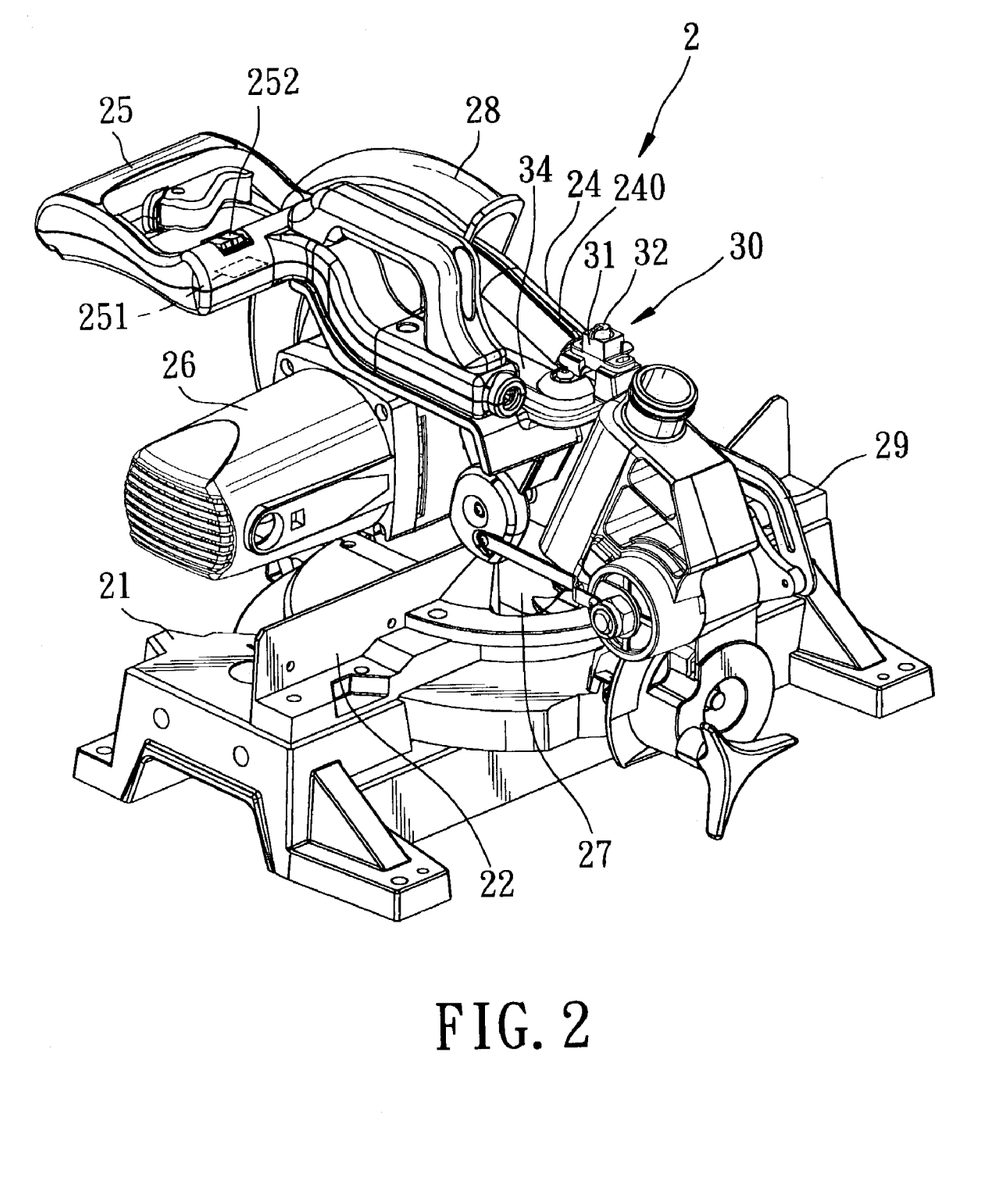
FIG. 2 is a perspective view of the preferred embodiment of a cutting apparatus according to the present invention.

FIG. 1 illustrates a conventional cutting apparatus 10 that includes a base 11 adapted to receive a workpiece 100 thereon, a blade-holding arm 12, a blade 13 mounted rotatably on the blade-holding arm 12 through an axle, and a light-emitting unit 17 that is secured to one side of the axle so as to be co-rotatable with the blade 13. The light-emitting unit 17 includes a disc-shaped housing that is formed with a hole 171, a laser-emitting member 172 mounted in the housing for projecting light through the hole 171 and for generating an image line on the workpiece 100 when the light-emitting unit 17 rotates with the blade 13, and a battery 173 electrically connected to the laser-emitting member 172. The image line is to be constantly aligned with a cutting line marked on the workpiece 100 by the user during a cutting operation. The workpiece 100 is to be cut into two pieces. Only one of the two pieces is desired, whereas the other one is normally discarded. For the sake of convenience and cutting precision, the desired piece is to be disposed at the same side of the blade 13 as the image line. For instance, if the light-emitting unit 17 is mounted on the left side of the blade 13 (see FIG. 1), the image line formed on the workpiece 100 will be disposed at the left side of the blade 13, and the orientation of the workpiece 100 relative to the blade 13 should be arranged in such a manner that the desired piece is disposed at the left side of the blade 13. Accordingly, if the desired piece is disposed at the right side of the blade 13, it would be inconvenient and difficult for the user to align the workpiece 100 during the cutting operation. Moreover, since the light-emitting unit 17 is co-rotatable with the blade 13, the only way to supply power to the blade 13 is with the use of the battery 173. One disadvantage arising from replacement of the battery 173 is that the light-emitting unit 17 is required to be detached from the axle. If the laser-emitting member 172 is to be electrically connected to an AC power supply through a wire, it is relatively difficult to prevent twist of the wire during rotation of the blade 13.

SUMMARY OF THE INVENTION

Therefore, the object of the present invention is to provide a cutting apparatus that is capable of overcoming the aforesaid drawbacks of the prior art.

According to the present invention, there is provided a cutting apparatus that comprises: a base adapted to support a workpiece thereon; a blade-holding arm mounted rotatably on the base; a blade mounted rotatably on the blade-holding arm and rotatable about an axis; and a light-emitting unit mounted on the blade-holding arm, disposed above the base, and adapted to project an image line on the workpiece such that the image line extends in a direction parallel to the blade. The light-emitting unit is movable on the blade-holding arm in a transverse direction relative to the blade between a first position, in which the image line formed on the workpiece is disposed at a first lateral side with respect to the blade, and a second position, in which the image line formed on the workpiece is disposed at a second lateral side, that is opposite to the first lateral side, with respect to the blade.

BRIEF DESCRIPTION OF THE DRAWINGS

In drawings which illustrate an embodiment of the invention.

DETAILED DESCRIPTION OF THE PREFERRED EMBODIMENT

Figure 7:
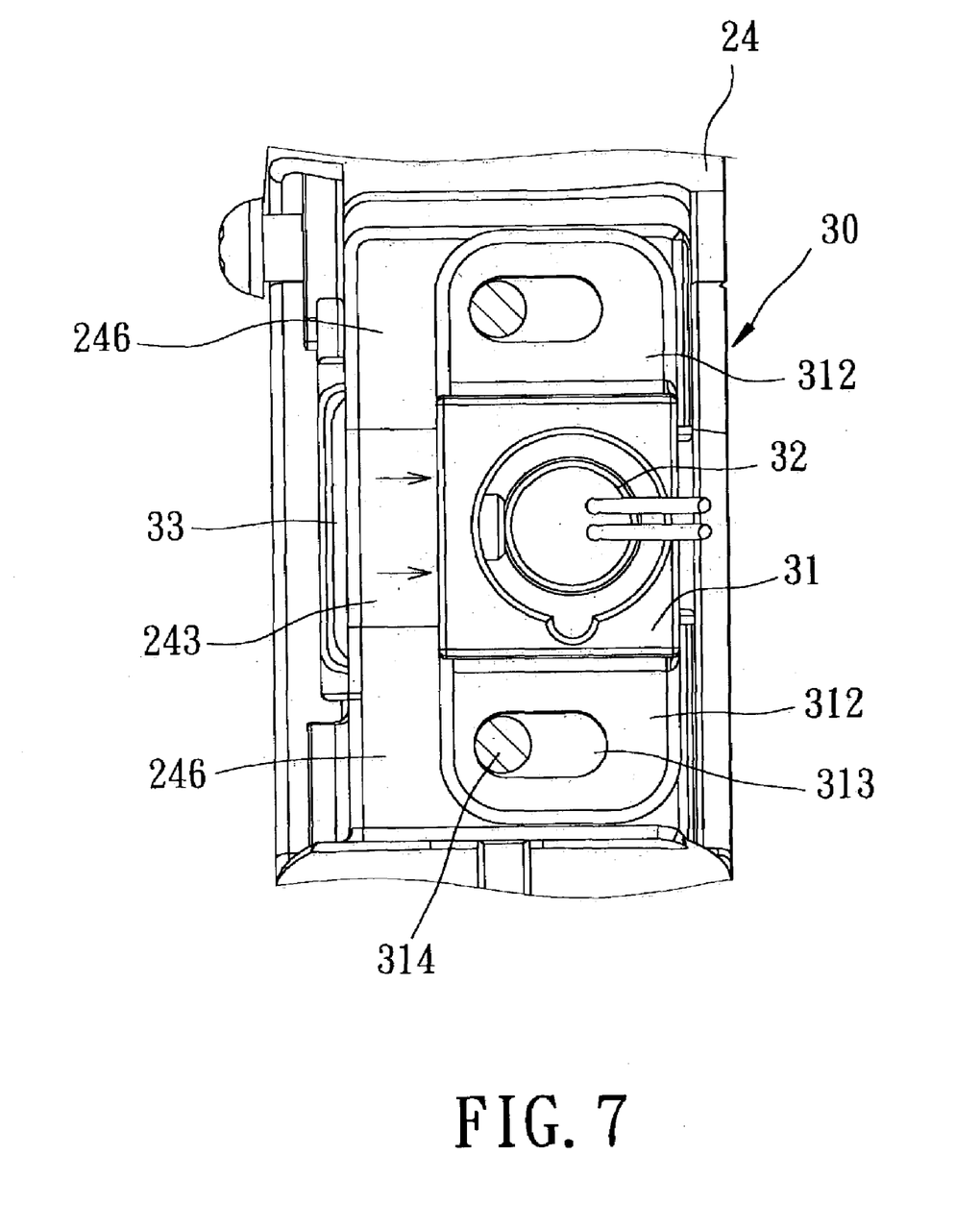
FIG. 7 is a fragmentary top view of the cutting apparatus to illustrate how the light-emitting unit is slid to a first position.
Figure 8:
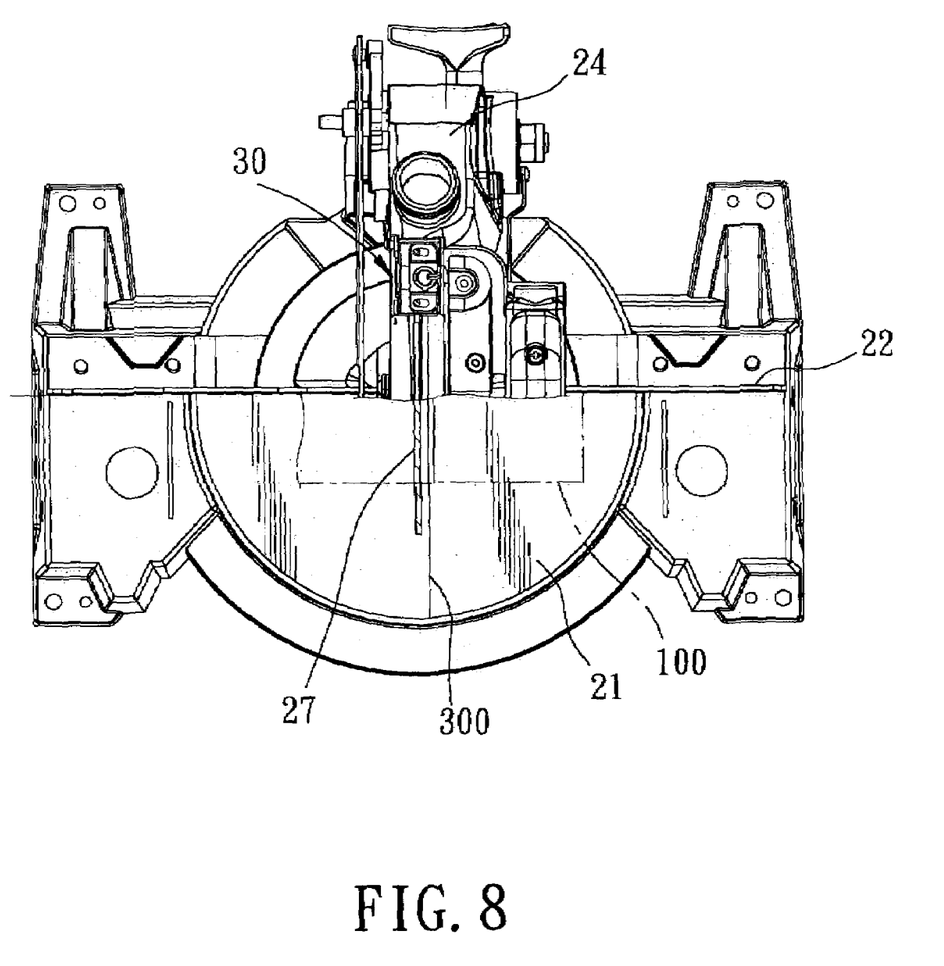
FIG. 8 is a top view of the cutting apparatus with the light-emitting unit slid to the first position.
Figure 9:
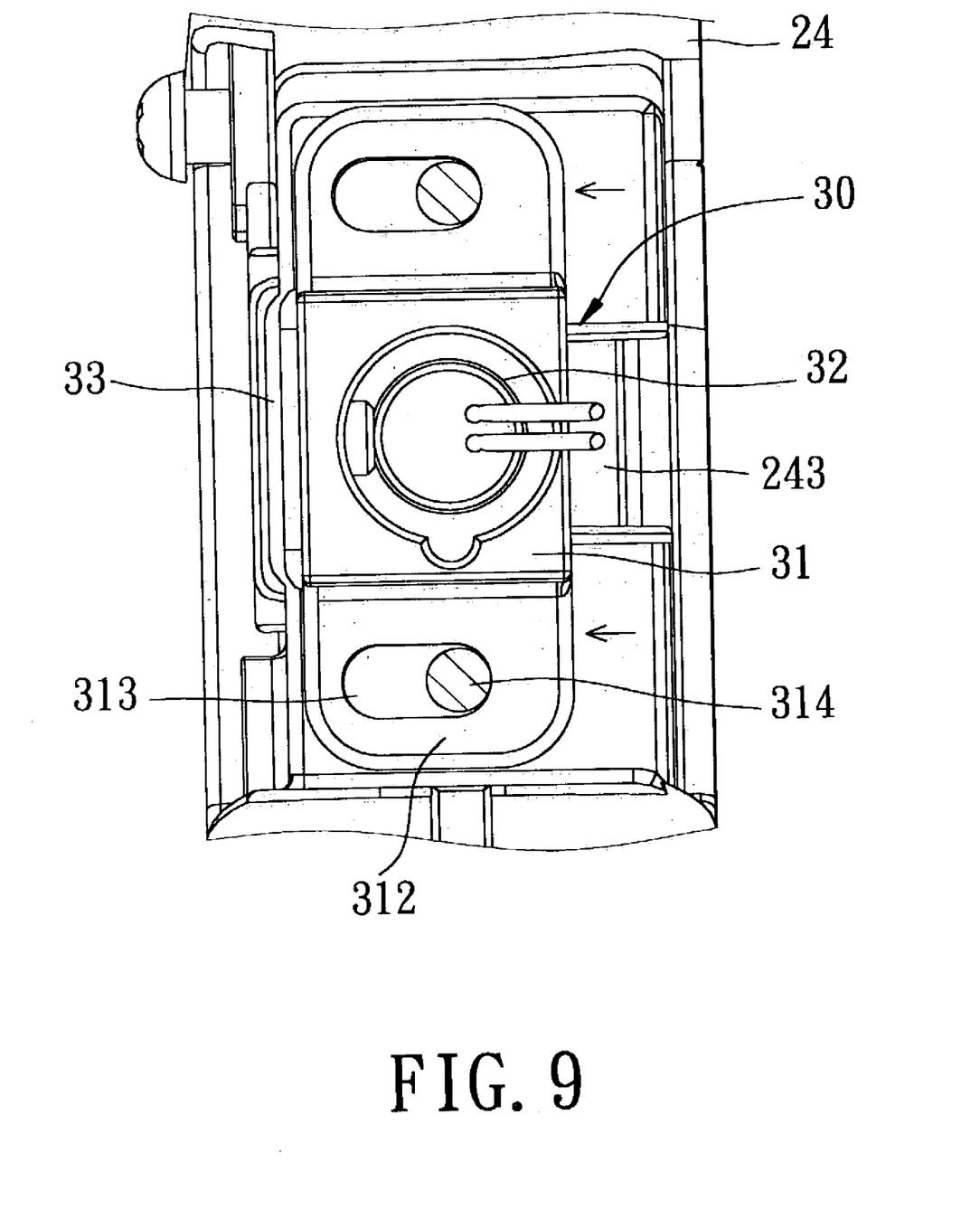
FIG. 9 is a fragmentary top view of the cutting apparatus to illustrate how the light-emitting unit is slid to a second position.
Figure 10:
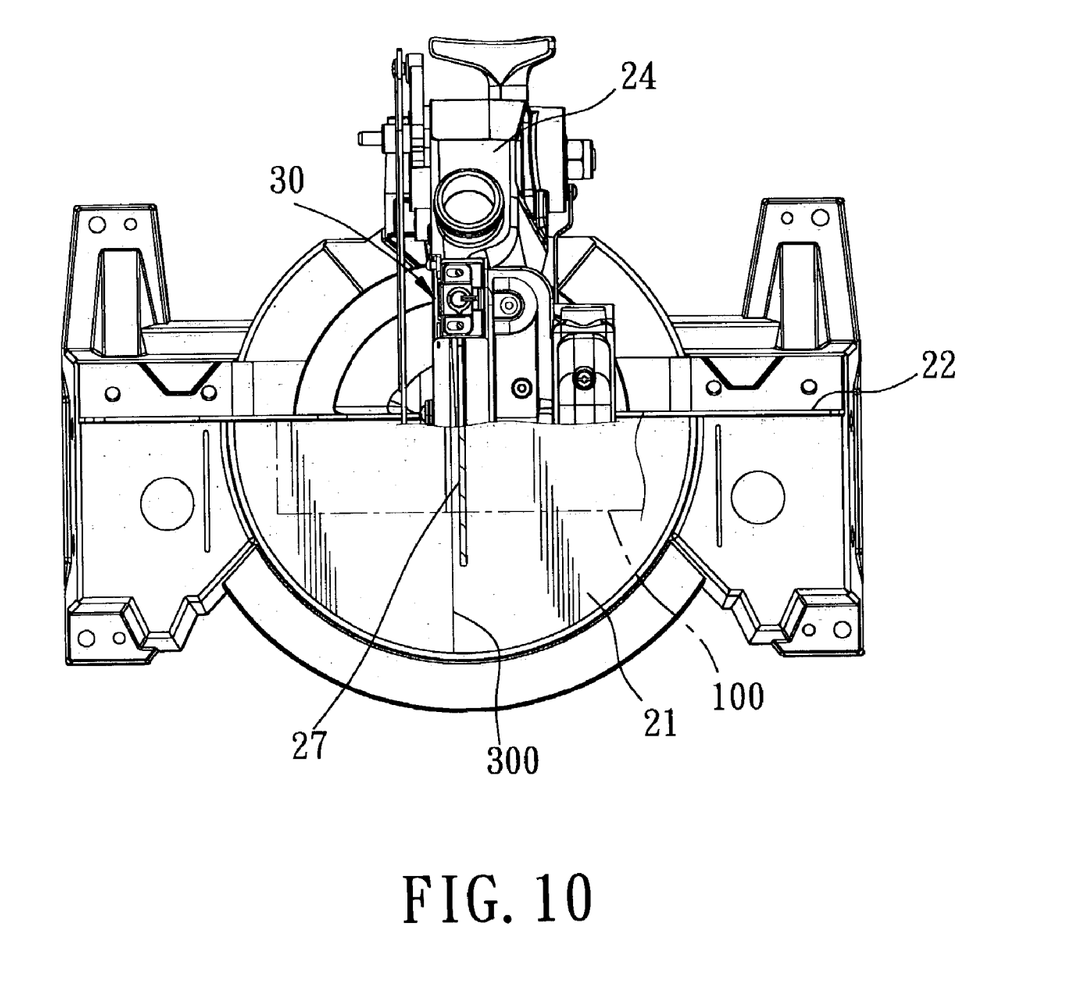
FIG. 10 is a top view of the cutting apparatus with the light-emitting unit slid to the second position.

FIGS. 2 to 6 illustrate a cutting apparatus 2 that includes: a base 21 adapted to support a workpiece 100 thereon (see FIG. 8); a blade-holding arm 24 mounted rotatably on the base 21; a motor 26 mounted on the blade-holding arm 24 and having an output shaft (not shown); a blade 27 mounted rotatably on the blade-holding arm 24 through the output shaft, driven by the motor 26, and rotatable about an axis; and a light-emitting unit 30 mounted on the blade-holding arm 24, disposed above the base 21, and adapted to project an image line 300. (see FIG. 5) on the workpiece 100 such that the image line 300 extends in a direction parallel to the blade 27. The light-emitting unit 30 is movable on the blade-holding arm 24 in a transverse direction relative to the blade 27 between a first position (see FIGS. 7 and 8), in which the image line 300 formed on the workpiece 100 is disposed at a first lateral side with respect to the blade 27, and a second position (see FIGS. 9 and 10), in which the image line 300 formed on the workpiece 100 is disposed at a second lateral side, that is opposite to the first lateral side, with respect to the blade 27.

Figure 3:
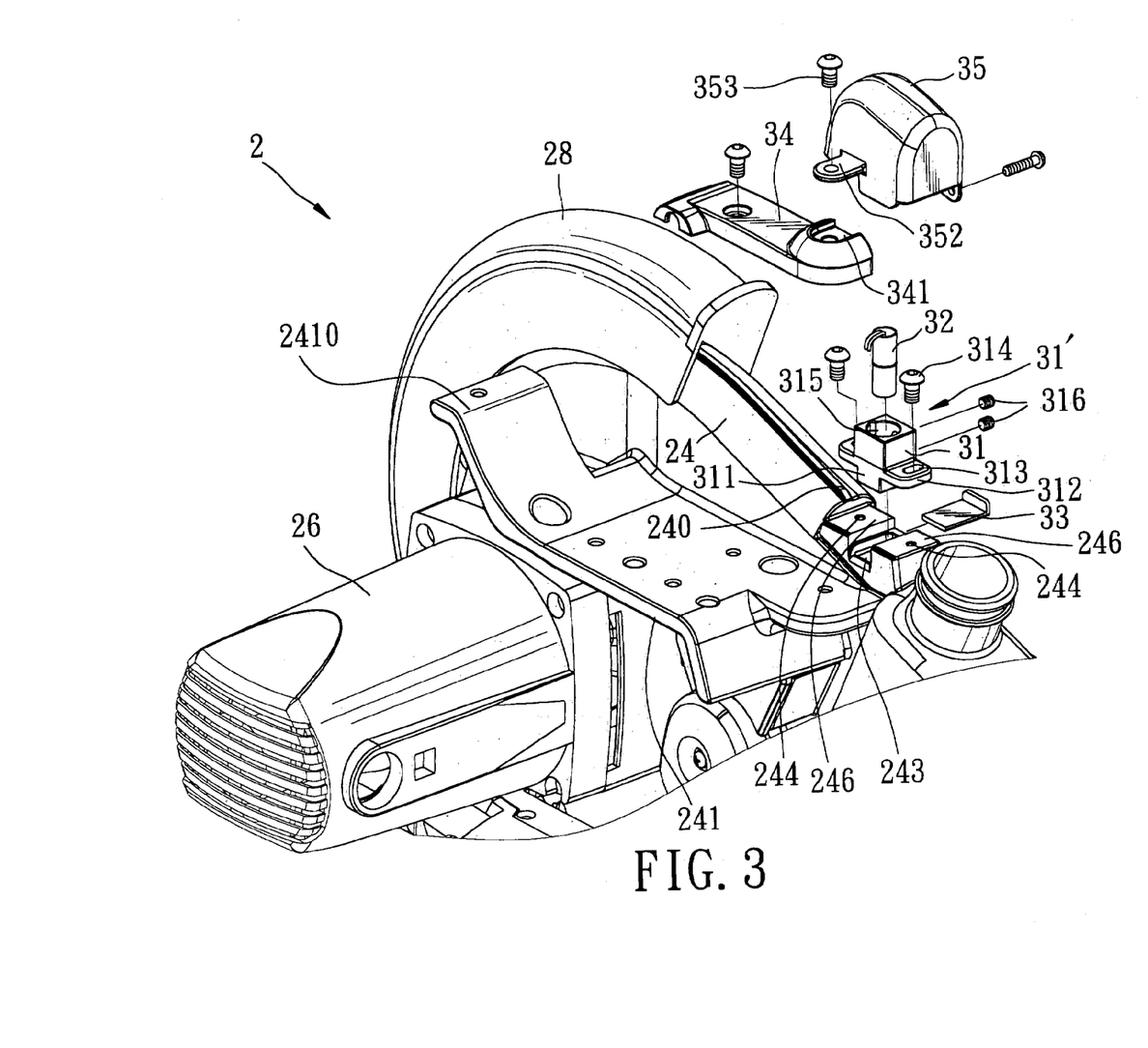
FIG. 3 is a fragmentary exploded perspective view of a light-emitting unit of the cutting apparatus of FIG. 2 in a disassembled state.
Figure 4:
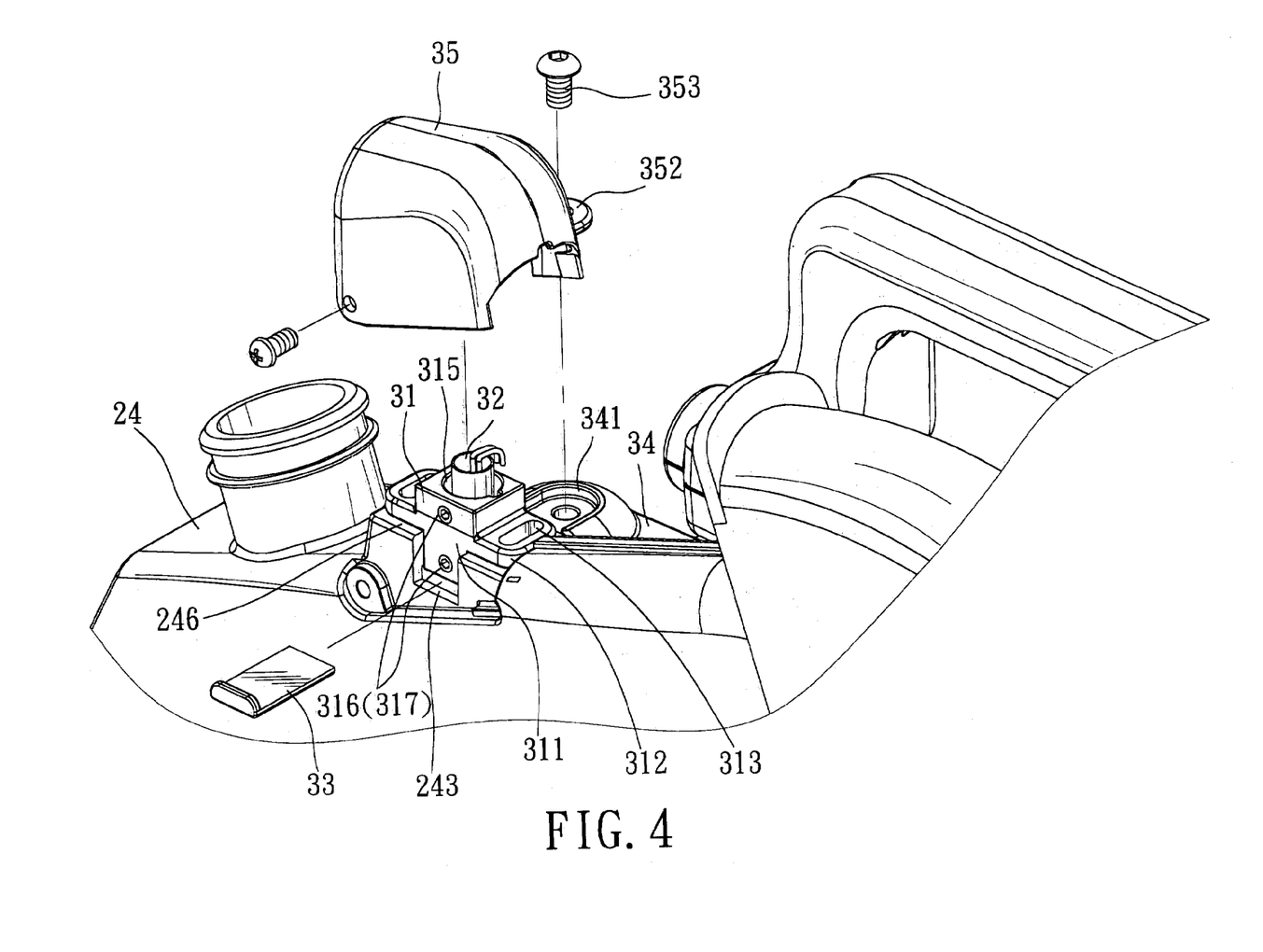
FIG. 4 is a fragmentary exploded perspective view of the light-emitting unit of the cutting apparatus of FIG. 2 in an assembled state.
Figure 5:
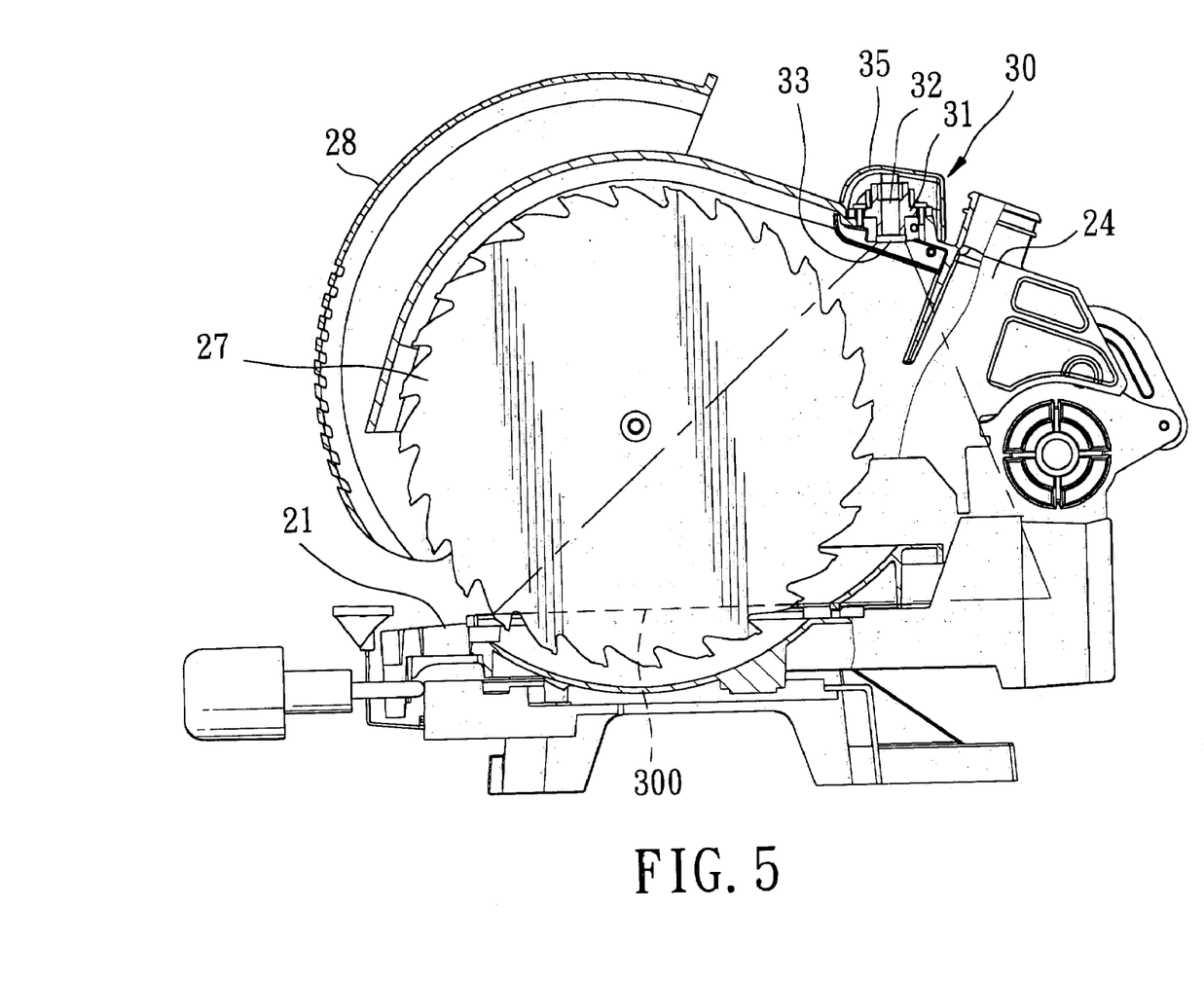
FIG. 5 is a partly sectional side view of the cutting apparatus of FIG. 2.
Figure 6:
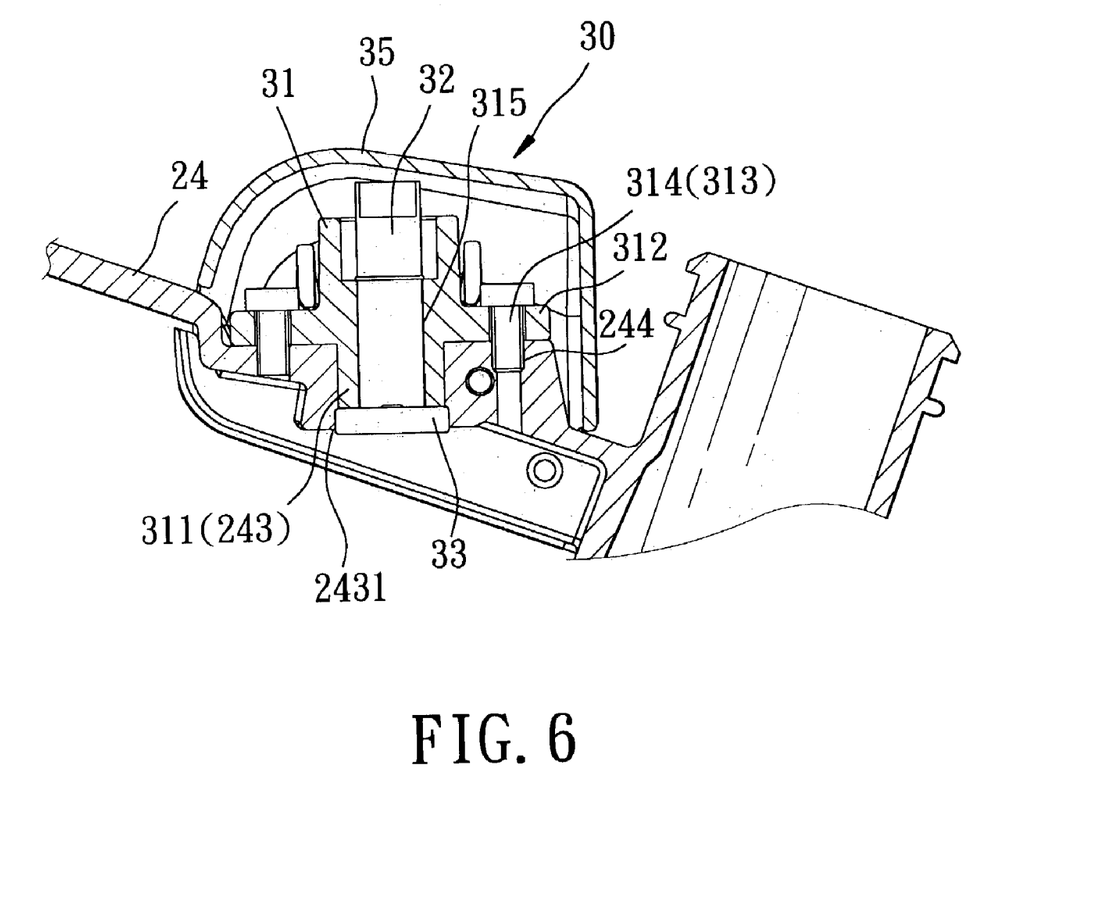
FIG. 6 is a fragmentary sectional view of the cutting apparatus of FIG. 2.

The blade-holding arm 24 has a top end 240, and is formed with a through-hole 243 that extends downwardly from the top end 240. The light-emitting unit 30 includes a seat 31' that is mounted movably on the blade-holding arm 24, and a laser-emitting member 32. The seat 31' includes a hollow block body 31 that has a lower portion 311 received in the through-hole 243 and that defines an inner space 315 therein, and two opposite wings 312 that project oppositely and transversely from two opposite sides of the block body 31 and that are seated on a periphery 246 of the through-hole 243. The laser-emitting member 32 is mounted in the inner space 315 in the block body 31 so as to project a laser beam onto the workpiece 100 (see FIG. 5). The wings 312 are respectively formed with two opposite elongated slots 313 that extend in the transverse direction. The periphery 246 of the through-hole 243 is formed with two opposite screw holes 244 that are respectively and vertically aligned with the slots 313. The cutting apparatus 2 further includes screw means 314 that extend through the slots 313 and that threadedly engage the screw holes 244 so as to permit positioning of the light-emitting unit 30 at a desired one of the first and second positions.

The through-hole 243 in the blade-holding arm 24 has a bottom end 2431. The cutting apparatus 2 further includes a transparent protective sheet 33 that is mounted slidably on the blade-holding arm 24, that extends through the bottom end 2431 of the through-hole 243 in the transverse direction, and that is disposed underneath the laser-emitting member 32 so as to protect the laser-emitting member 32 from deposition of sawdust thereon. The protective sheet 33 is detachable from the blade-holding arm 24 for cleaning purposes.

The block body 31 is formed with two fastener holes 317 that are in spatial communication with the inner space 315. The light-emitting unit 30 further including screw means 316 that threadedly engage the fastener holes 317 in the block body 31 and that extend therethrough into the inner space 315 to abut against the laser-emitting member 32 so as to secure the laser-emitting member 32 in the inner space 315.

A blade guard 28 is mounted rotatably on the blade-holding arm 24 for covering the blade 27, and is connected to a linkage mechanism 29 so as to be rotatable between covering and uncovering positions. A mounting plate 241 extends transversely from the blade-holding arm 24, and has a connecting end 2410 that is connected to a handle 25 (see FIG. 2). A guard-mounting seat 34 is secured to the mounting plate 241, and is formed with a recess 341. The light-emitting unit 30 is guarded by a guard 35 that has a lug 352 which is received in the recess 341 and which is secured to the guard-mounting seat 34 through screw means 353. A circuit board 251 is mounted in the handle 25, and is electrically connected to the laser-emitting member 32. A switch 252 is mounted on the handle 25, and is electrically connected to the circuit board 251 for actuating the laser-emitting member 32. A fence 22 is disposed upright from the base 21 for blocking sawdust during a cutting operation.

Since the light-emitting unit 30 is slidable in the transverse direction between two lateral sides with respect to the blade 27, the workpiece 100 can be oriented on the base 21 relative to the blade 27 according to the preference of the user without causing any inconvenience and without affecting cutting precision during the cutting operation. Moreover, since the light-emitting unit 30 is mounted on the blade-holding arm 24, which does not rotate with the blade 27, the laser-emitting member 32 can be electrically connected to an AC power supply.

With the invention thus explained, it is apparent that various modifications and variations can be made without departing from the spirit of the present invention.

We claim:

1. A cutting apparatus comprising:
   a base for supporting a workpiece thereon;
   a blade-holding arm mounted rotatably on said base;
   a blade mounted rotatably on said blade-holding arm and rotatable about an axis; and
   a light-emitting unit mounted on said blade-holding arm, disposed above said base, and operable so as to project an image line on the workpiece such that said image line extends in a direction parallel to said blade, said light-emitting unit being movable on said blade-holding arm in a lateral direction relative to said blade between a first position, in which said image line projected on the workpiece is disposed at a first lateral side with respect to said blade, and a second position, in which said image line projected on the workpiece is disposed at a second lateral side, that is opposite to said first lateral side, with respect to said blade;
   wherein said blade-holding arm has a top end and is formed with a through-hole that extends downwardly from said top end, said light-emitting unit including a seat that is mounted movably on said blade-holding arm, and a laser-emitting member, said seat including a hollow block body that has a lower portion received in said through-hole and that defines an inner space therein, and two opposite wings that project oppositely and transversely from two opposite sides of said block body and that are seated on a periphery of said through-hole, said laser-emitting member being mounted in said inner space in said block body so as to project a laser beam onto the workpiece, said wings being respectively formed with two opposite elongated slots that extend in said lateral direction and extending through said wings in a direction generally parallel to said through hole, said periphery of said through-hole being formed with two opposite screw holes that are respectively and vertically aligned with said slots, said cutting apparatus further comprising first screw means that extend through said slots and that threadedly engage said screw holes so as to permit positioning of said light-emitting unit at a desired one of said first and second positions.

2. The cutting apparatus of claim 1, wherein said through-hole has a bottom end, said cutting apparatus further comprising a transparent protective sheet that is mounted slidably on said blade-holding arm, that extends through said bottom end of said through-hole in said lateral direction, and that is disposed underneath said laser-emitting member so as to protect said laser-emitting member from deposition of sawdust thereon, said protective sheet being detachable from said blade-holding arm.

3. The cutting apparatus of claim 2, wherein said block body is formed with at least a fastener hole that is in spatial communication with said inner space, said light-emitting unit further including second screw means that threadedly engages said fastener hole in said block body and that extends therethrough into said inner space to abut against said laser-emitting member.

* * * * *